(12) United States Patent
Sano et al.

(10) Patent No.: US 12,738,392 B2
(45) Date of Patent: Sep. 15, 2026

(54) WIRING HARNESS

(71) Applicant: YAZAKI CORPORATION, Tokyo (JP)

(72) Inventors: Mitsuhisa Sano, Makinohara (JP); Taku Furuta, Makinohara (JP); Kenichi Imou, Makinohara (JP); Junya Kato, Makinohara (JP); Hiroki Suganuma, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 193 days.

(21) Appl. No.: 18/927,811

(22) Filed: Oct. 25, 2024

(65) Prior Publication Data

US 2025/0157690 A1 May 15, 2025

(30) Foreign Application Priority Data

Nov. 14, 2023 (JP) ................................ 2023-194001

(51) Int. Cl.
*H01B 7/00* (2006.01)
*B60R 16/02* (2006.01)
*H02G 3/04* (2006.01)

(52) U.S. Cl.
CPC ....... *H01B 7/0045* (2013.01); *B60R 16/0215* (2013.01); *H02G 3/0406* (2013.01)

(58) Field of Classification Search
None
See application file for complete search history.

(56) References Cited

U.S. PATENT DOCUMENTS 3,627,903 A * 12/1971 Plummer ............. H01B 7/0045 174/72 A
4,217,157 A * 8/1980 Stoltze .................... C22C 47/20 156/286
4,902,241 A * 2/1990 Lockard ................. H01R 12/68 439/395
5,735,041 A * 4/1998 Zaguskin ............ B60R 16/0215 29/857
6,481,101 B2 * 11/2002 Reichinger ............ H05K 3/103 156/289
7,029,320 B2 * 4/2006 Maejima ................ H01R 12/79 439/495
11,037,706 B2 * 6/2021 Bilas ...................... B33Y 40/20
(Continued)

FOREIGN PATENT DOCUMENTS

GB 2169750 A * 7/1986 ............. H05K 1/189
JP H09277853 A * 10/1997
(Continued)

*Primary Examiner* — Krystal Robinson
(74) *Attorney, Agent, or Firm* — KENEALY VAIDYA LLP

(57) ABSTRACT

A wiring harness includes a first stacked module that includes a flat routing member having flexibility, and a first connector that is provided on the flat routing member, and a second stacked module that includes a plurality of routing members having conductivity, and a second connector that is provided on the plurality of routing members, and the second stacked module is stacked on the first stacked module in a stacking direction that crosses an extending direction of the flat routing member, in a state where both the second connector and the first connector face one side in the stacking direction.

10 Claims, 9 Drawing Sheets

(56) References Cited

U.S. PATENT DOCUMENTS 11,618,393 B1 * 4/2023 Ledesma ............. B60R 16/0207 174/72 A
2002/0026709 A1 * 3/2002 Reichinger ......... B60R 16/0207 156/289
2004/0003938 A1 * 1/2004 Yoshida ............... H01R 12/616 174/117 F
2006/0030171 A1 * 2/2006 Hung ..................... H05K 1/118 439/67
2006/0042820 A1 * 3/2006 Lin ........................ H05K 1/028 174/117 F
2006/0286848 A1 * 12/2006 Kumakura ............. H01R 12/67 439/422
2007/0117476 A1 * 5/2007 Kumakura ............. H01R 13/11 439/885
2012/0000704 A1 * 1/2012 Yamashita .......... B60R 16/0215 174/72 A
2013/0206928 A1 8/2013 Murakoshi et al.
2014/0022449 A1 * 1/2014 Nagasawa .............. H04N 23/51 348/373
2015/0222101 A1 * 8/2015 Kajiwara ............. H01B 7/0045 174/138 R
2016/0036151 A1 * 2/2016 Tominaga ............. H01R 43/16 29/874
2016/0052468 A1 * 2/2016 Kanagawa ............... H01R 4/72 174/68.3
2016/0197460 A1 * 7/2016 Kitamura ............... H01R 13/64 174/72 A
2016/0365658 A1 * 12/2016 Hikosaka ............. H01R 12/772
2017/0229211 A1 * 8/2017 Yoshida ................. H01B 13/22
2017/0327060 A1 * 11/2017 Nakajima ........ H01B 13/01254
2018/0130572 A1 * 5/2018 Shirai ................ H01B 11/1091
2018/0294555 A1 * 10/2018 Nagashima .............. H01Q 9/42
2019/0008033 A1 * 1/2019 Chung ................... H05K 1/118
2020/0091689 A1 * 3/2020 Kisu ................... B60R 16/0215
2020/0127259 A1 * 4/2020 Yoshida .............. H01M 50/298
2020/0214132 A1 * 7/2020 Morimoto .............. H02K 11/33
2021/0119378 A1 * 4/2021 Nagasaka .......... H01R 13/5213
2021/0309168 A1 * 10/2021 Kisu ...................... H02G 3/305
2021/0309169 A1 * 10/2021 Kisu ................... B60R 16/0215
2022/0215982 A1 * 7/2022 Takamatsu ........... H01B 7/0823
2022/0360030 A1 * 11/2022 Matsunaga ....... H01M 10/4207
2023/0082327 A1 * 3/2023 Arai ....................... H02G 3/305 174/72 A
2023/0085407 A1 * 3/2023 Murata ............... B60R 16/0215 174/72 A
2023/0115337 A1 * 4/2023 Yamaguchi .............. H01B 7/40 174/72 A
2023/0138937 A1 * 5/2023 Oshino ................ H02G 3/0406 174/72 A
2023/0162885 A1 * 5/2023 Kou ..................... H01B 7/0846 174/72 A
2023/0187103 A1 * 6/2023 Aramaki .................. H01B 7/40 174/72 A
2023/0249634 A1 * 8/2023 Bilas .................... H05K 1/0219 307/10.1
2023/0256922 A1 * 8/2023 Kogure ............... B60R 16/0215 174/72 A
2024/0365466 A1 * 10/2024 Kikuchi .............. B60R 16/0238
2024/0388075 A1 * 11/2024 Kikuchi ................... H02G 3/30
2025/0210224 A1 * 6/2025 Saito .................... H01B 7/0045
2025/0357613 A1 * 11/2025 Oga .................... H01M 50/209

FOREIGN PATENT DOCUMENTS

JP 2012-55105 A 3/2012
JP 2025098686 A * 7/2025 ......... B60R 16/0215
WO WO-2018155166 A1 * 8/2018 ......... B60R 16/0215

* cited by examiner

WIRING HARNESS

CROSS-REFERENCE TO RELATED APPLICATION(S)

The present application claims priority to and incorporates by reference the entire contents of Japanese Patent Application No. 2023-194001 filed in Japan on Nov. 14, 2023.

BACKGROUND OF THE INVENTION

1. Field of the Invention

The present invention relates to a wiring harness.

2. Description of the Related Art

As a technique relating to a conventional wiring harness, for example, Japanese Patent Application Laid-open No. 2012-055105 discloses a wiring harness that includes a flat routing member having flexibility, a protector that protects the flat routing member, and a fixing member that fixes the protector to an attachment unit of a vehicle.

Meanwhile, the wiring harness described in Japanese Patent Application Laid-open No. 2012-055105 described above has room for further improvements in terms of, for example, improvements in mountability on a vehicle.

SUMMARY OF THE INVENTION

The present invention has been made in view of the circumstances described above, and it is an object of the present invention to provide a wiring harness that can improve mountability on a vehicle.

In order to achieve the above mentioned object, a wire harness according to one aspect of the present invention includes a first stacked module that includes a flat routing member having flexibility, and a first connector that is provided on the flat routing member; and a second stacked module that includes a plurality of routing members having conductivity, and a second connector that is provided on the plurality of routing members, wherein the second stacked module is stacked on the first stacked module in a stacking direction in a state where both the second connector and the first connector face one side in the stacking direction, the stacking direction crossing an extending direction of the flat routing member. The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is an exemplary perspective view of a vehicle that a wiring harness according to an embodiment is applied to;

DETAILED DESCRIPTION OF THE PREFERRED EMBODIMENTS

An embodiment according to the present invention is described in detail below with reference to the drawings. Note that the embodiment described below is not restrictive of this invention. Furthermore, components in the embodiment described below include components that those skilled in the art could easily replace, or substantially the same components. Note that herein, ordinal numbers are only used to distinguish parts, members, portions, positions, directions, or the like from each other, and do not indicate order or priority.

Embodiment

Figure 1:
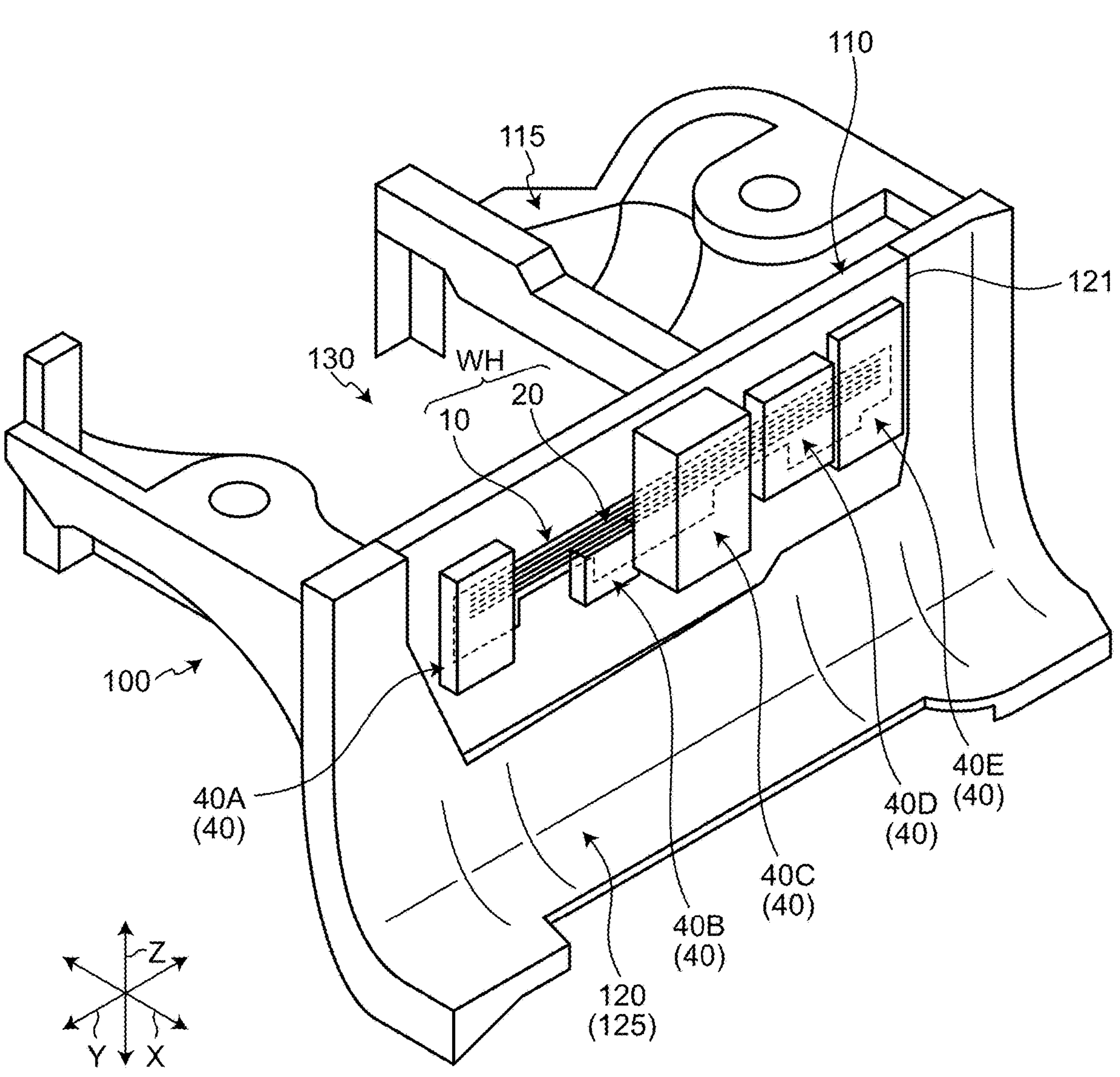

FIG. 1 is a perspective view of a vehicle 100 that a wiring harness WH according to an embodiment is applied to. The wiring harness WH according to the present embodiment that is illustrated in FIG. 1 is applied to the vehicle 100, connects respective devices equipped in the vehicle 100 to each other, and is used to supply power or perform signal communication. For example, the wiring harness WH according to the present embodiment is provided on a dash panel 120 of the vehicle 100, and is provided inside an instrument panel (not illustrated) of the vehicle 100. The dash panel 120 is a partition wall that divides an engine room 130 of the vehicle 100 from a vehicle interior (a cabin), and forms a structural member (a skeleton member) of the vehicle 100.

Here, in the present embodiment, the dash panel 120 includes, for example, a dash panel body 125 that is made of metal, and a vehicle body panel 110 that is made of resin. In addition, in the present embodiment, the dash panel body 125 is molded integrally with a peripheral panel 115 or the like of the engine room 130. This enables the dash panel 120 to have enhanced rigidity or strength, and therefore the vehicle body panel 110 can be formed by using a resin molded product. Stated another way, in the present embodiment, the vehicle body panel 110 is constituted by a part that is different from the dash panel body 125. The vehicle body panel 110 is installed, for example, in a recess 121 that is formed in the dash panel body 125, and the vehicle body panel 110 together with the dash panel body 125 forms part of the dash panel 120.

Note that in the description below, from among a first direction, a second direction, and a third direction that cross each other, the first direction is referred to as a "stacking direction X", the second direction is referred to as an "extending direction Y", and the third direction is referred to as a "width direction Z". Here, the stacking direction X, the extending direction Y, and the width direction Z are roughly orthogonal to each other. The stacking direction X typically corresponds to a direction of stacking a first stacked module 10 and a second stacked module 20 of the wiring harness WH, or another direction, and runs along a vehicle forward/backward direction. The extending direction Y typically corresponds to a longer-side direction (an extending direction) of a flat routing member 11 of the wiring harness WH, or another direction, and runs along a vehicle width direction. The width direction Z typically corresponds to a shorter-side direction of the flat routing member 11 of the wiring harness WH, or another direction, and runs along a vehicle height direction. Note that respective directions to be used in the description below are described as directions in a state where the wiring harness WH has been mounted on the vehicle 100, unless otherwise specified.

Figure 2:
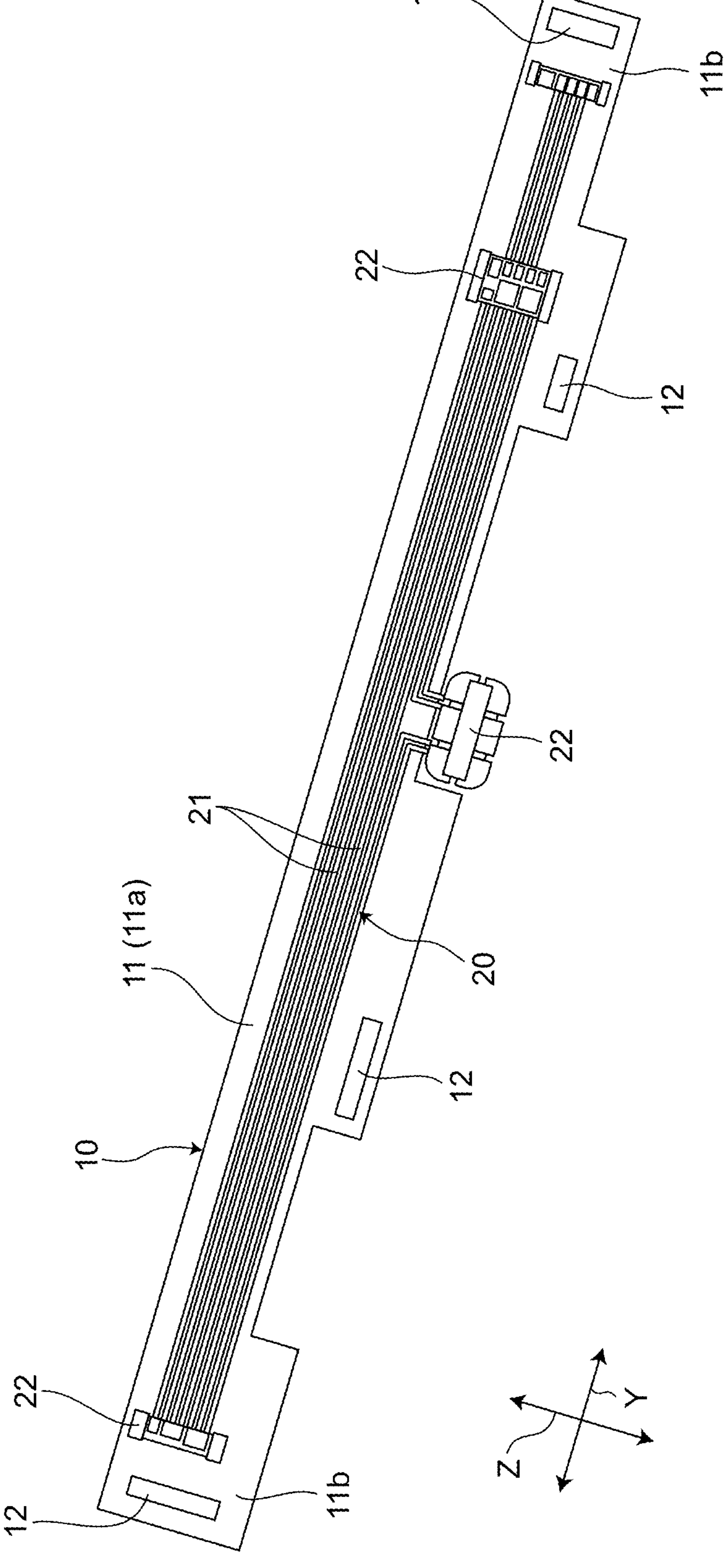
FIG. 2 is an exemplary perspective view of the wiring harness according to the embodiment.
Figure 3:
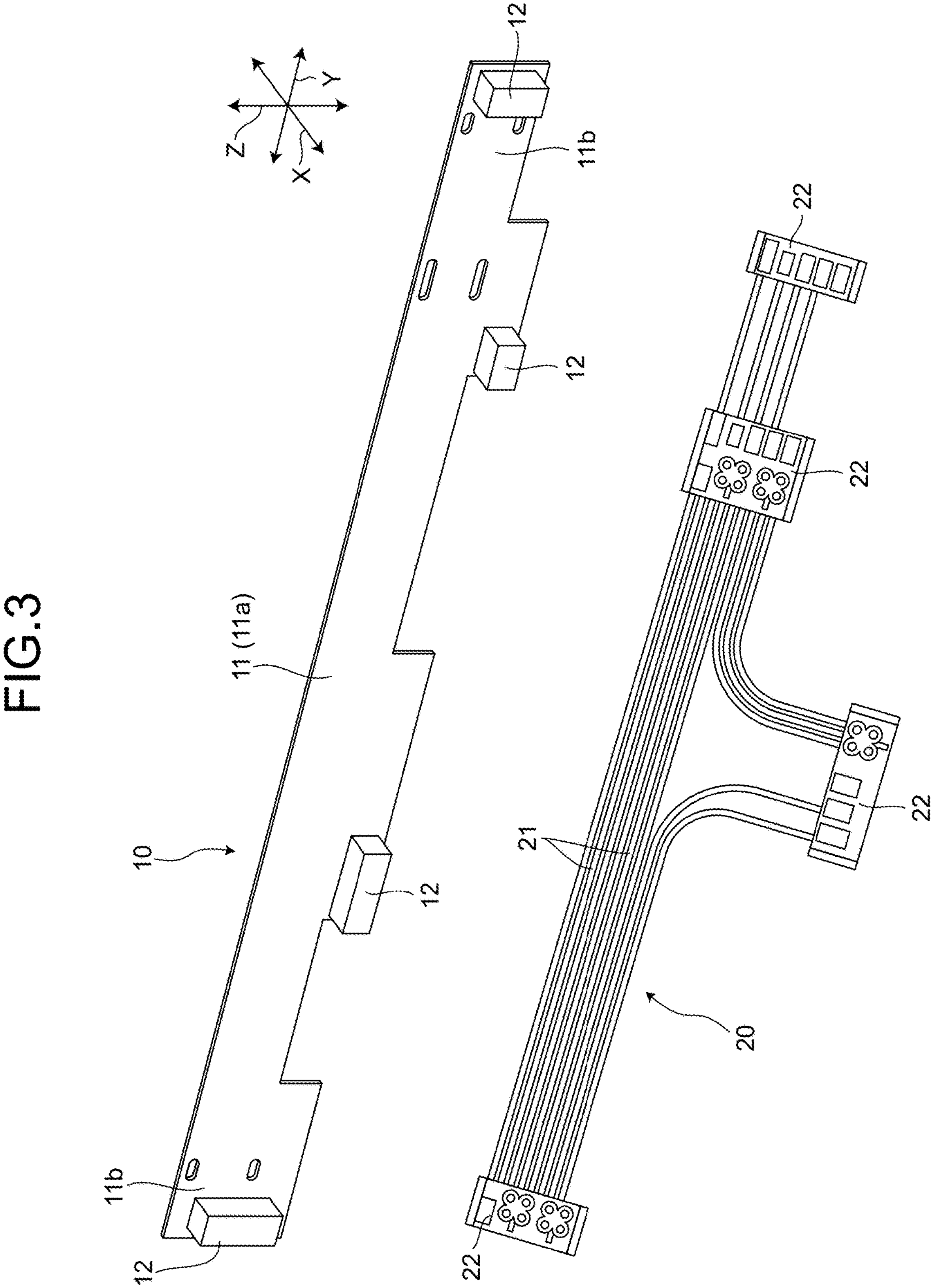
FIG. 3 is an exemplary exploded perspective view of the wiring harness according to the embodiment.

FIG. 2 is a perspective view of the wiring harness WH, and FIG. 3 is an exploded perspective view of the wiring harness WH. As illustrated in FIGS. 2 and 3, the wiring harness WH according to the present embodiment includes, for example, the first stacked module 10 and the second stacked module 20. The first stacked module 10 includes the flat routing member 11 that extends in the extending direction Y, and a plurality of first connectors 12 that is provided on a surface 11*a* of the flat routing member 11. Here, the first stacked module 10 is connected to a first ECU 40A (see FIG. 1) of a control device 40 by using a first connector 12 that is provided at an end 10*b* located on one side in the extending direction Y, and is connected to a second ECU 40E of the control device 40 by using another first connector 12 that is provided at an end 10*b* located on another side in the extending direction Y.

Note that the first ECU 40A and the second ECU 40E that have been described here are typically zone ECUs that comprehensively control pieces of equipment in a peripheral region (a zone) of the dash panel 120, but are not limited to this. Furthermore, plural pieces of equipment 40B to 40D, such as the other ECUs of the control device 40, are provided between the first ECU 40A and the second ECU 40E. The equipment 40B is electrically connected to the flat routing member 11 by using a first connector 12 that is provided in a central portion in the extending direction Y of the first stacked module 10, and the equipment 40D is electrically connected to the flat routing member 11 by using another first connector 12 that is provided in the central portion in the extending direction Y of the first stacked module 10.

As illustrated in FIGS. 2 and 3, the flat routing member 11 is a routing member that forms the wiring harness WH, and is formed by using, for example, a flexible printed circuits (FPC), a flexible flat cable (FFC), or the like. The flat routing member 11 is a routing member that is thin, has flexibility, and has a flat shape. The flat routing member 11 is formed, as a whole, in a plate shape having a rectangular shape that is laterally long in the extending direction Y. The flat routing member 11 includes, for example, a base film, a wiring pattern, and a cover lay.

The base film is a substrate that is excellent in flexibility, and specifies the entire shape of the flat routing member 11. The base film is formed by using, for example, polyimide resin that is excellent in heat resistance. The wiring pattern is stacked on a surface (a mounting surface) of the base film, and forms a plurality of conductor circuits (pattern layers). The wiring pattern is formed by using, for example, a conductive material such as copper foil, and is printed as a printed circuit on the surface of the base film. The cover lay is stacked over the entire surface of the base film by using a not-illustrated adhesive, and functions as a protective layer that protects the conductor circuits or the like of the wiring pattern.

Furthermore, the flat routing member 11 includes, for example, four first connectors 12. Here, in the flat routing member 11, a single first connector 12 is provided at each of the ends 11*b* located on both sides in the extending direction Y, and two first connectors 12 are provided at an end located on one side in the width direction Z. These first connectors 12 are connected to the control device 40 described above by using a connector 41 (see FIG. 4) on a side of the control device 40 described above.

Furthermore, the plurality of first connectors 12 is conductive with the wiring pattern of the flat routing member 11. The plurality of conductor circuits that is formed by the wiring pattern can function as any circuit of, for example, a signal circuit, a signal GND circuit, and a power ground circuit. The signal circuit is, for example, a circuit that transmits a communication signal between the control device 40 and on-board equipment such as various electronic devices in the vehicle 100. The signal GND circuit is a circuit that accompanies the signal circuit, is conductive between pieces of on-board equipment, and causes the pieces of on-board equipment to have the same potential serving as a reference of a circuit operation. The power ground circuit is a circuit that grounds a power supply system of the on-board equipment.

The second stacked module 20 is a wiring module that is stacked on the first stacked module 10. The second stacked module 20 includes a plurality of routing members 21 having conductivity, and a plurality of second connectors 22 that is provided in a terminal of the plurality of routing members 21. Here, the second stacked module 20 includes, for example, four second connectors 22, and is stacked on the surface 11*a* of the flat routing member 11. In addition, the second stacked module 20 is connected to the first ECU 40A (see FIG. 1) of the control device 40 described above by using a second connector 22 that is provided at the end 10*b* located on one side in the extending direction Y, and is connected to the second ECU 40E of the control device 40 by using another second connector 22 that is provided at the end 10*b* located on another side in the extending direction Y.

Note that from among the plural pieces of equipment 40B to 40D that are disposed between the first ECU 40A and the second ECU 40E, for example, the equipment 40C is electrically connected to the plurality of routing members 21 by using a second connector 22 that is provided in a central portion in the extending direction Y of the second stacked module 20, and the equipment 40D is electrically connected to the plurality of routing members 21 by using another second connector 22 that is provided in the central portion in the extending direction Y of the second stacked module 20.

The plurality of routing members 21 is formed by using, for example, a specialized electric wire that transmits a signal or power that is difficult to be appropriately transmitted by the flat routing member 11, such as a high-speed communication line that transmits a signal of high-speed communication or a power line (a thick electric wire) that transmits large-current power. In other words, the plurality of routing members 21 is formed by using, for example, a routing member 21 that would fail to secure performance (shielding performance) when being inserted into the flat routing member 11, such as the high-speed communication line, a routing member 21 that would increase in size, such as the thick electric wire, or the like. Each of the plurality of routing members 21 includes a linear conductor (see FIG. 6) and insulating covering that covers an outside of the conductor. For example, in a case where the plurality of routing members 21 is the high-speed communication line, the plurality of routing members 21 is formed by using a shielded electric wire for which an outside of the insulating covering is further covered with a shield such as a braid.

Figure 4:
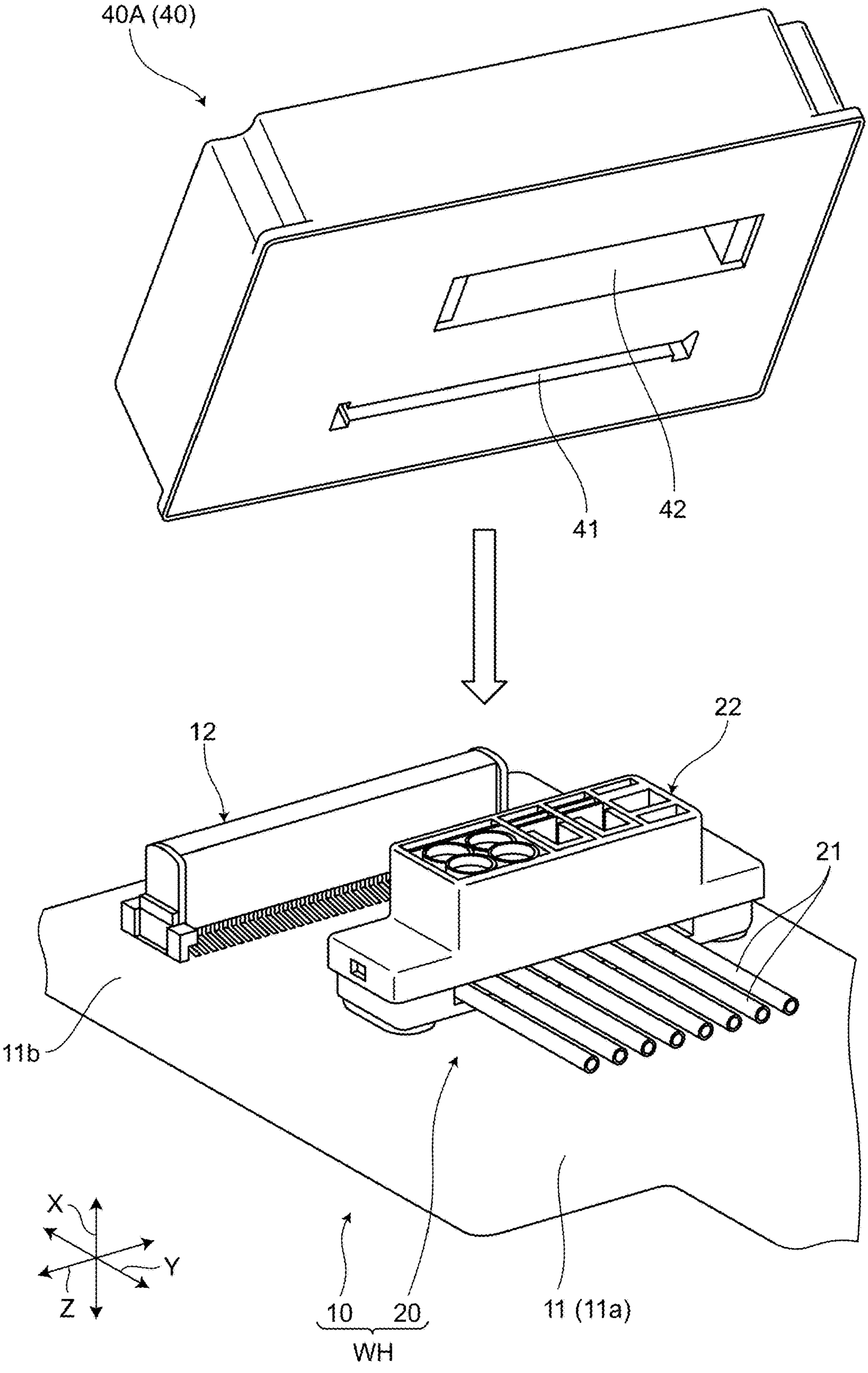
FIG. 4 is an exemplary perspective view illustrating a structure of connection of a first connector and a second connector of the wiring harness according to the embodiment to connectors on a side of a control device.
Figure 5:
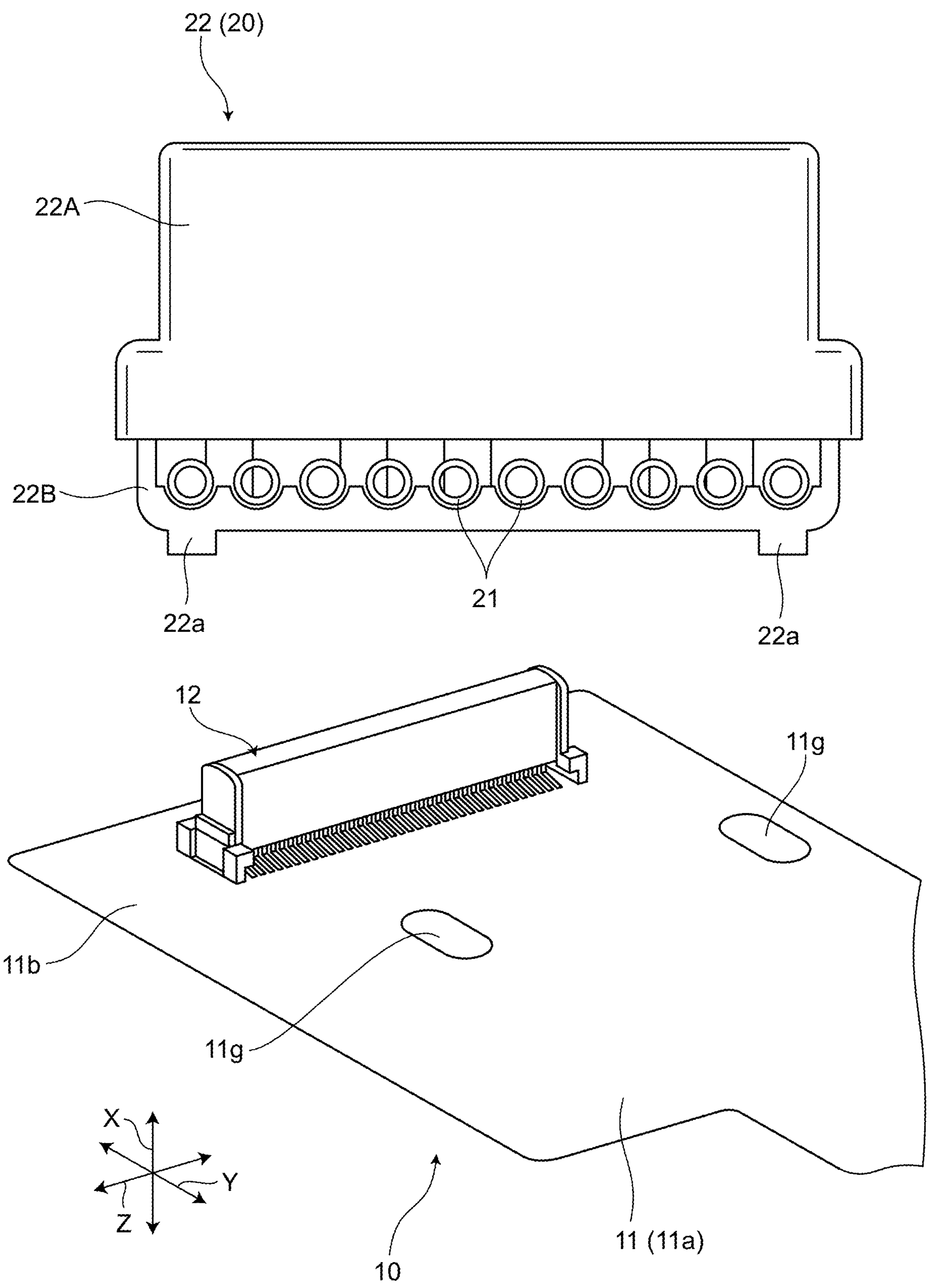
FIG. 5 is an exemplary and schematic exploded perspective view of the vicinity of the second connector of the wiring harness according to the embodiment.

FIG. 4 is a perspective view illustrating a structure of connection of the first connector 12 and the second connector 22 of the wiring harness WH to the connectors 41 and 42 on the side of the control device 40, and FIG. 5 is a schematic exploded perspective view of the vicinity of the second connector 22 of the wiring harness WH. As illustrated in FIGS. 4 and 5, in the present embodiment, the plurality of routing members 21 is routed to be planarly arranged along the surface 11*a* of the flat routing member 11. The second stacked module 20 is formed in a flat shape that has a certain width in the width direction Z, but is thin in the stacking direction X, by using the plurality of routing members 21 that is arranged in the width direction Z.

Here, in the present embodiment, the second stacked module 20 is stacked on the first stacked module 10 in the stacking direction X in a state where both the second connector 22 and the first connector 12 face one side in the stacking direction X. Specifically, in the present embodiment, the first connector 12 and the second connector 22 face a side of the vehicle interior (the side of the control device 40) that is opposite to the vehicle body panel 110 described above in the stacking direction X. The first connector 12 is connectable to the connector 41 on the side of the control device 40 such as the first ECU 40A, and the second connector 22 is connectable to the connector 42 on the side of the control device 40 such as the first ECU 40A. As described above, the first connector 12 and the second connector 22 are disposed in a standby state relative to the control device 40 such as the first ECU 40A.

Furthermore, in the present embodiment, the first stacked module 10 is provided with an opening 11*g* (see FIG. 5) that penetrates the flat routing member 11 in the stacking direction X. A pair of openings 11*g* are provided, for example, at both ends in the width direction Z of the flat routing member 11. In addition, the second connector 22 includes a pair of legs 22*a* that protrude toward another side in the stacking direction X, and are respectively inserted into the openings 11*g* of the flat routing member 11. The pair of legs 22*a* engage with the pair of openings 11*g*, and therefore the second connector 22 is positioned relative to the flat routing member 11. Furthermore, the second connector 22 is installed in a state where the legs 22*a* abut onto the vehicle body panel 110 (see FIG. 6) through the openings 11*g*.

Figure 6:
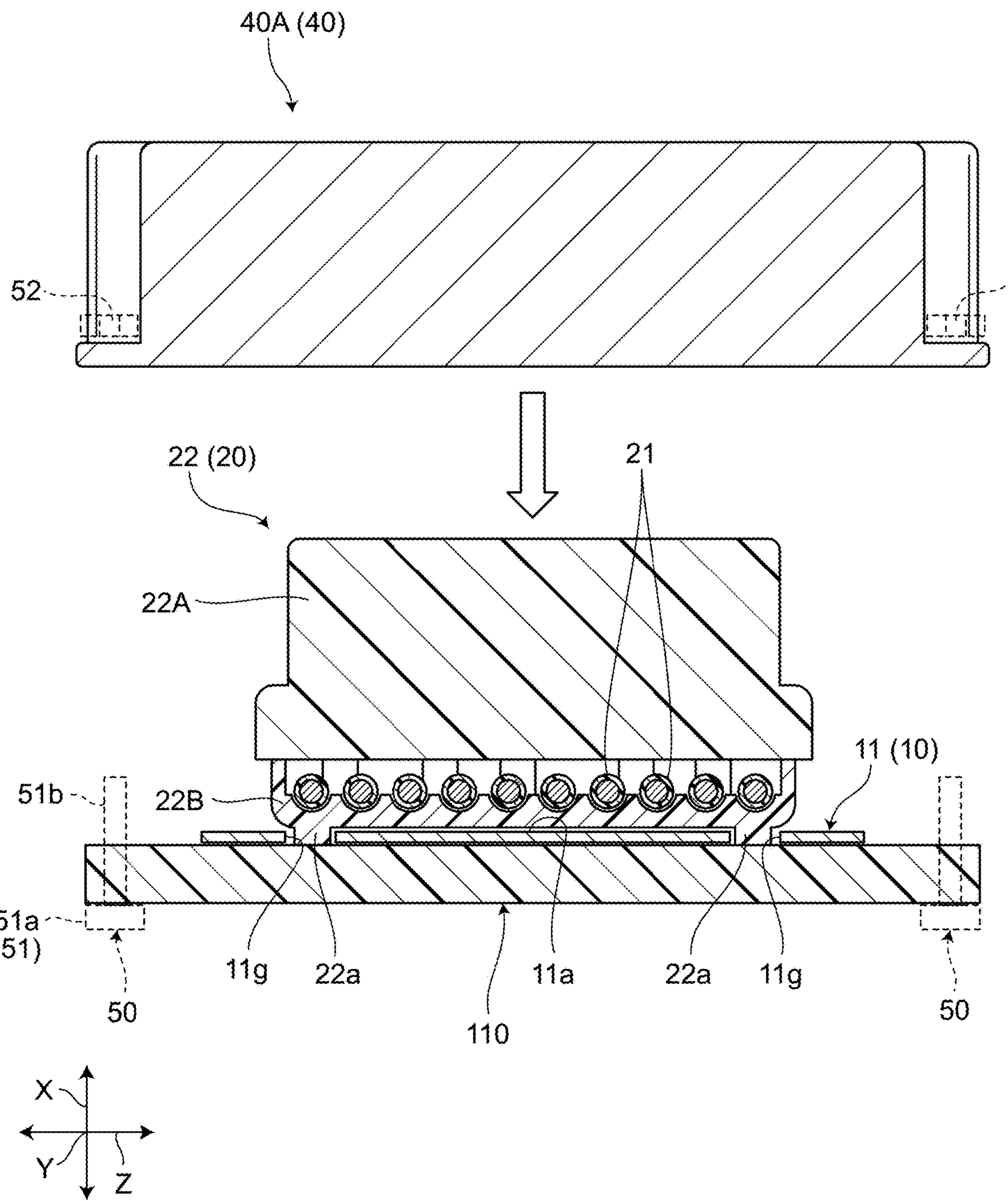
FIG. 6 is an exemplary sectional view illustrating the structure of connection of the first connector and the second connector of the wiring harness according to the embodiment to the connectors on the side of the control device.

FIG. 6 is a sectional view illustrating the structure of connection of the first connector 12 and the second connector 22 of the wiring harness WH to the connectors 41 and 42 on the side of the control device 40. As illustrated in FIG. 6, in the present embodiment, the first stacked module 10 is disposed closer to the vehicle body panel 110 than the second stacked module 20, and the second stacked module 20 is stacked on the surface 11*a* that is opposite to the vehicle body panel 110 of the flat routing member 11 in the stacking direction X. Stated another way, the second stacked module 20 is disposed closer to the vehicle interior (the control device 40) than the first stacked module 10, and the first connector 12 and the second connector 22 face a side of the vehicle interior (the side of the control device 40) that is opposite to the vehicle body panel 110.

Here, in the present embodiment, the first connector 12 and the second connector 22 are respectively fitted into the connectors 41 and 42 described above located on the side of the control device 40 in accordance with fastening the control device 40 to the vehicle body panel 110 by using a fastening member 50. Specifically, in the present embodiment, the fastening member 50 includes a bolt 51 and a nut 52, and the control device 40 is provided with a flange that includes a through-hole into which the bolt 51 is inserted in the stacking direction X. The bolt 51 is attached, for example, in a state where a head 51*a* is lock onto an outer surface (a surface that is opposite to the first stacked module 10) of the vehicle body panel 110, and a shaft 51*b* penetrates the vehicle body panel 110.

Then, the bolt 51 is fastened to the nut 52 in a state where the bolt 51 protrudes from the vehicle body panel 110 toward one side (the side of the control device 40) in the stacking direction X, and is inserted into the through-hole that has been formed in the flange of the control device 40. By doing this, the bolt 51 functions as an assistance bolt at the time of collectively fitting the first connector 12 and the second connector 22 into the connectors 41 and 42 on the side of the control device 40, and therefore a task of fitting the first connector 12 and the second connector 22 into the connectors 41 and 42 on the side of the control device 40 can be performed more easily or more smoothly. A pair of fastening members 50 and a pair of flanges are provided, for example, on both sides in the width direction Z with the first connector 12 and the second connector 22 interposed therebetween.

Figure 7:
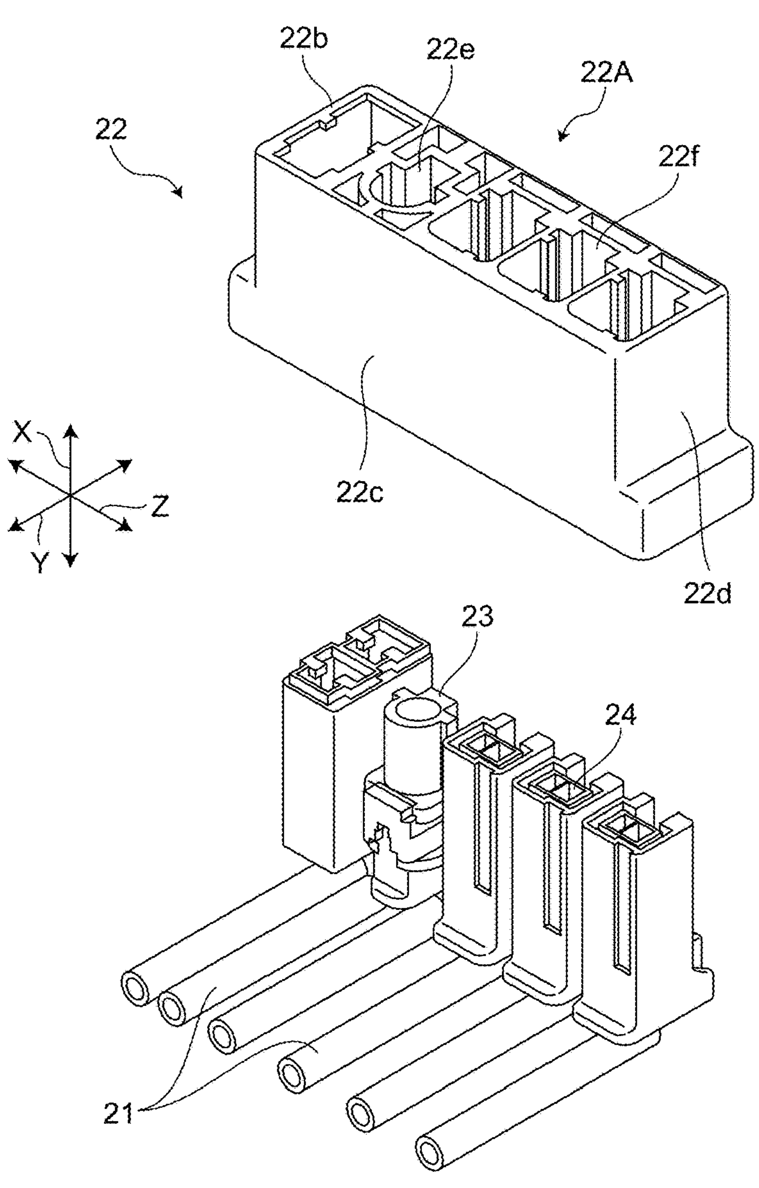
FIG. 7 is an exemplary exploded perspective view of the second connector located on another side in an extending direction of the wiring harness according to the embodiment.
Figure 7:
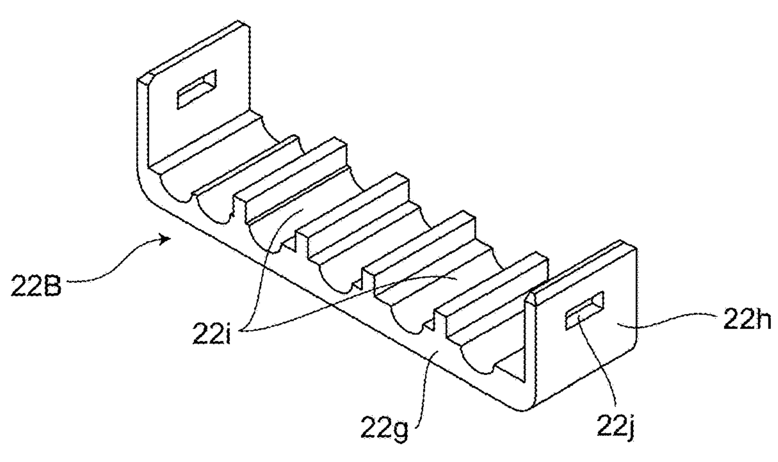
Figure 8:
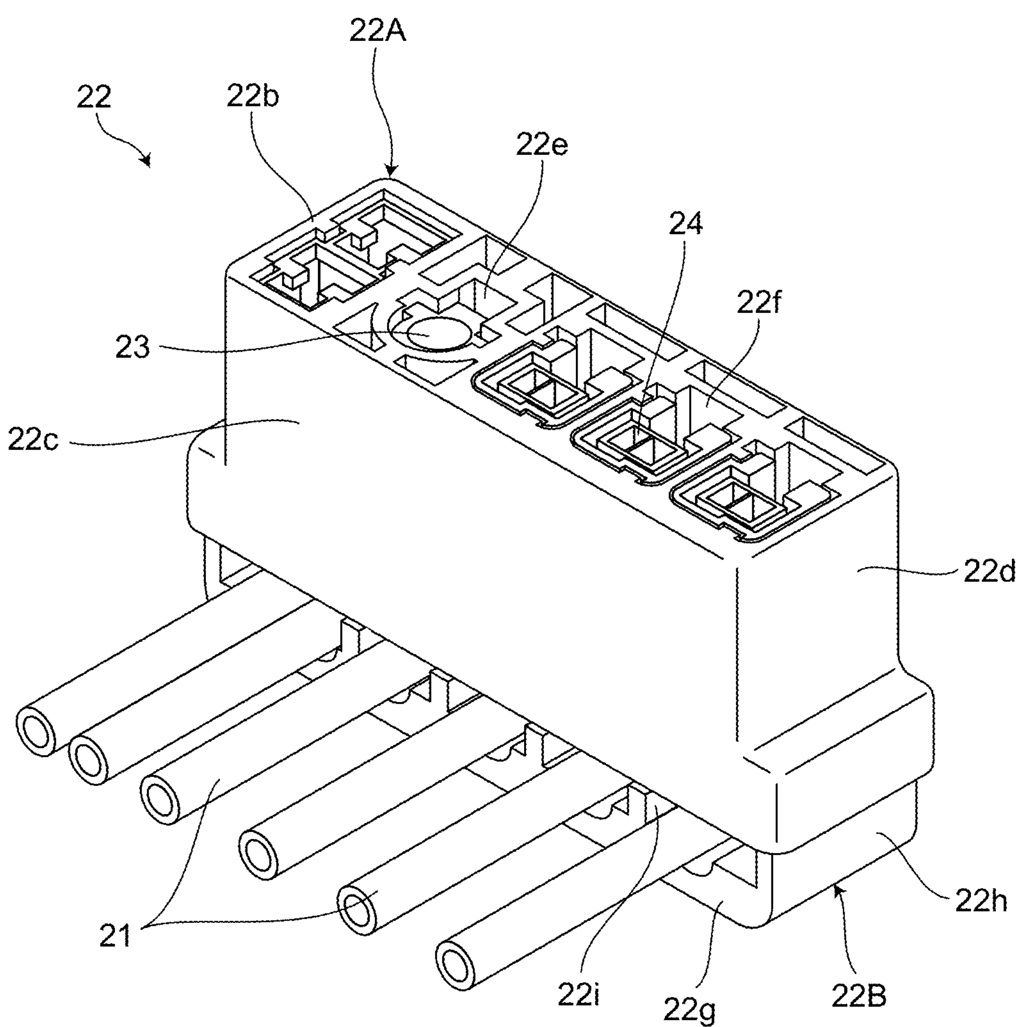
FIG. 8 is an exemplary perspective view of the second connector of FIG. 7.
Figure 8:
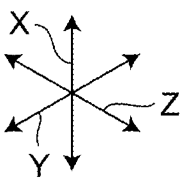

FIG. 7 is an exploded perspective view of the second connector 22 located on another side in the extending direction Y of the wiring harness WH, and FIG. 8 is a perspective view of the second connector 22 of FIG. 7. As illustrated in FIGS. 7 and 8, the second connector 22 includes, for example, a housing 22A, an undercover 22B, and a plurality of connector terminals 23 and 24. The housing 22A covers the plurality of routing members 21 and the plurality of connector terminals 23 and 24 from one side in the stacking direction X, and the undercover 22B covers the plurality of routing members 21 and the plurality of connector terminals 23 and 24 from another side in the stacking direction X. The housing 22A and the undercover 22B are formed of, for example, synthetic resin having insulation.

The plurality of connector terminals 23 and 24 is electrically connected to terminals of the connector 42 on the side of the control device 40. The connector terminal 23 or 24 includes, for example, an electrical connection unit that is electrically connected to the terminal of the connector 42 on the side of the control device 40, and an electric-wire connection unit that is electrically connected to a conductor of a terminal of the routing member 21. For example, the connector terminal 23 is a connector terminal of the low voltage differential signaling (LVDS) standard, and the connector terminal 24 is a connector terminal of a standard that is different from the standard of the connector terminal 23.

The housing 22A includes, for example, an upper wall 22*b*, a pair of side walls 22*c*, and a pair of end walls 22*d*. The upper wall 22*b*, the pair of side walls 22*c*, and the pair of end walls 22*d* are a structure for sectioning insertion spaces 22*e* and 22*f* of the housing 22A. The insertion spaces 22*e* and 22*f* are spaces into which the connector terminals 23 and 24 described above are inserted in the stacking direction X. The insertion spaces 22*e* and 22*f* penetrate the upper wall 22*b* in the stacking direction X, and are arranged in the width direction Z. The plurality of connector terminals 23 and 24 is held in a state where the plurality of connector terminals 23 and 24 is divided from each other in the width direction Z by the housing 22A.

The undercover 22B includes, for example, a lower wall 22*g* and a pair of end walls 22*h*. The undercover 22B covers the plurality of routing members 21 and the connector terminals 23 and 24 from another side in the stacking direction X and both sides in the width direction Z, by using the lower wall 22*g* and the pair of end walls 22*h*, and the undercover 22B is open on both sides in the extending direction Y. Furthermore, the lower wall 22*g* is provided with a recess 22*i* that holds the plurality of routing members 21 and the connector terminals 23 and 24. The recess 22*i* is recessed in a two-stage shape along outer shapes of the plurality of routing members 21 and the connector terminals 23 and 24. Furthermore, the pair of end walls 22*h* are provided with a locking hole 22*j* onto which a craw that is provided on inner faces of the pair of end walls 22*d* of the housing 22A is locked. The undercover 22B is integrated with the housing 22A due to what is called snap-fitting caused by locking the locking holes 22*j* onto the craws.

Figure 9:
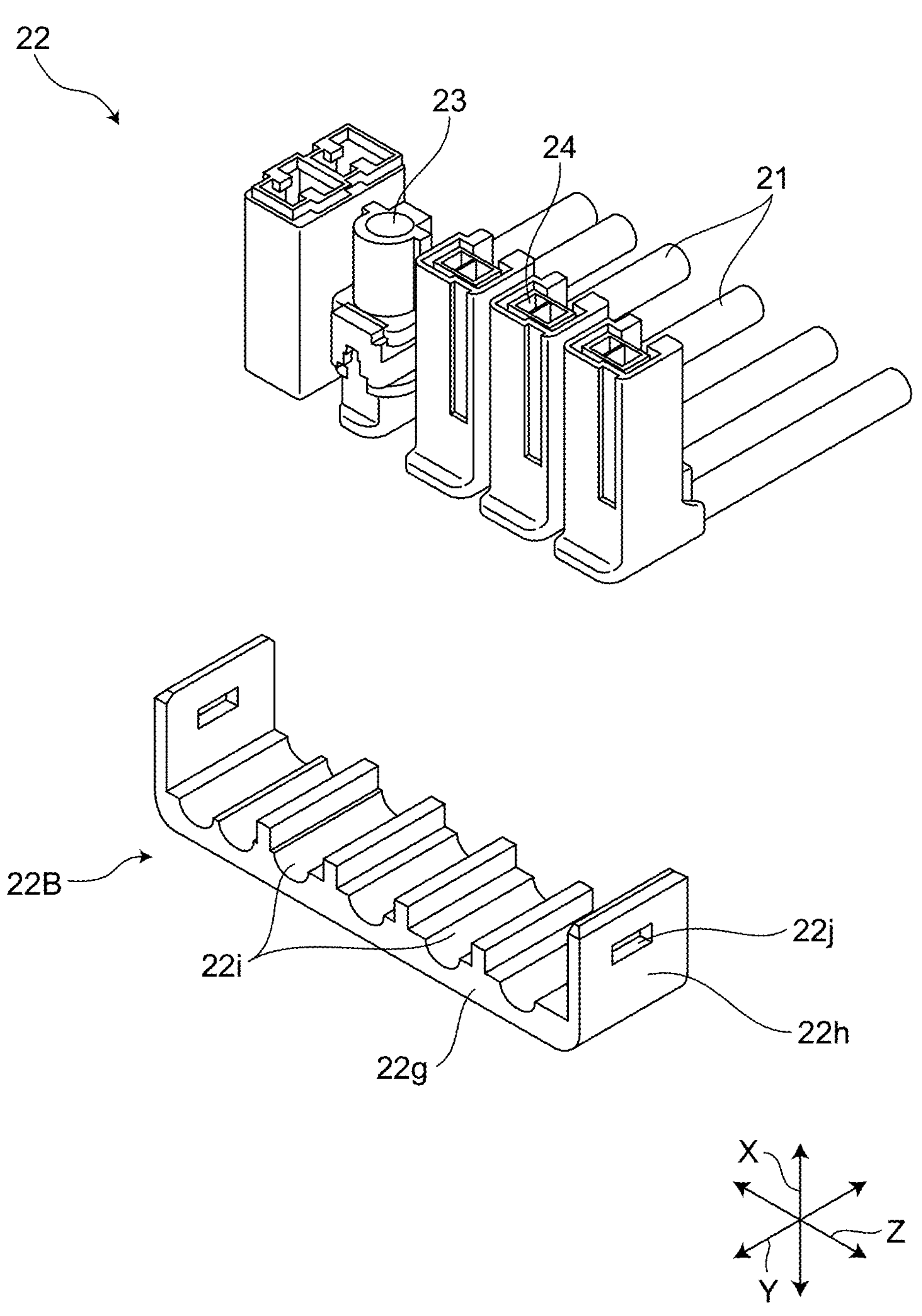
FIG. 9 is an exemplary exploded perspective view of the second connector located on one side in the extending direction of the wiring harness according to the embodiment.

FIG. 9 is an exploded perspective view of the second connector 22 located on one side in the extending direction Y of the wiring harness WH. As illustrated in FIG. 9, in the present embodiment, the undercover 22B is open on both sides in the extending direction Y. Therefore, the plurality of routing members 21 can be led out from any of both sides in the extending direction Y of the undercover 22B, and this enables the undercover 22B to be shared by the second connectors 22 that are different in a direction in which the plurality of routing members 21 is led out, the second connector 22 located on the other side in the extending direction Y of the wiring harness WH described above and the second connector 22 located on the one side in the extending direction Y. Note that in FIG. 9, the housing 22A of the second connector 22 is omitted for the sake of convenience.

As described above, the second stacked module 20 according to the present embodiment includes the plurality of routing members 21 and the second connector 22. By employing this configuration, for example, routing members 21 that would fail to secure performance (shielding performance) when being inserted into the flat routing member 11, such as high-speed communication lines, can be collected by the second connector 22, and therefore a task of connection to the control device 40 can be performed more easily, more smoothly, or more rapidly in comparison with a conventional structure in which a plurality of high-speed communication lines is individually connected to the control device 40.

Furthermore, the wiring harness WH according to the present embodiment includes the flat routing member 11. Accordingly, the wiring harness WH formed by using the flat routing member 11 is reduced in weight in comparison with a general wiring harness in which various electric wires have been bundled. Here, in case where the wiring harness WH described above is installed in the vehicle 100, it is assumed that the length of the wiring harness WH is about 1000 mm. If the wiring harness WH having such a length is formed by only using electric wires, there is a possibility of an increase in weight of the entirety of the wiring harness WH. In contrast, according to the present embodiment, the wiring harness WH includes the flat routing member 11, and this can handle an increase in size of the wiring harness WH while preventing the entirety of the wiring harness WH from increasing in weight.

Furthermore, in general, the wiring harness in which various electric wires have been bundled is manually manufactured by an operator. In contrast, the flat routing member 11 can be manufactured in an automated manner, and therefore the wiring harness WH including the flat routing member 11 can reduce man-hours of manufacturing the wiring harness WH. Furthermore, in general, it is difficult to transport a large-sized wiring harness in which various electric wires have been bundled due to its weight. In contrast, according to the present embodiment, the flat routing member 11 has, for example, an advantage of a reduction in the number of days required to manufacture the wiring harness WH itself or the vehicle 100 using the wiring harness WH, or an advantage in which a manufacturing site is not likely to be limited.

As described above, the wiring harness WH according to the present embodiment includes the first stacked module 10 that includes the flat routing member 11 having flexibility, and the first connector 12 that is provided on the flat routing member 11, and the second stacked module 20 that includes the plurality of routing members 21 having conductivity, and the second connector 22 that is provided on the plurality of routing members 21, and the second stacked module 20 is stacked on the first stacked module 10 in the stacking direction X that crosses the extending direction Y of the flat routing member 11, in a state where both the second connector 22 and the first connector 12 face one side in the stacking direction X. By employing this configuration, in the wiring harness WH, for example, the second stacked module 20 can be disposed to be stacked on the first stacked module 10 in the stacking direction X in a state where both the second connector 22 and the first connector 12 face one side in the stacking direction X. As a result of this, the wiring harness WH can improve mountability on the vehicle 100.

Furthermore, in the wiring harness WH according to the present embodiment, the plurality of routing members 21 is formed by using a communication line that transmits a signal, or a power line that transmits power, and is routed to be planarly arranged. By employing this configuration, in the wiring harness WH, for example, the second stacked module 20 including the plurality of routing members 21 and the second connector 22 can be formed in a flat shape, and therefore the entirety of the wiring harness WH including the second stacked module 20 and the first stacked module 10 can be reduced in thickness.

Furthermore, in the wiring harness WH according to the present embodiment, the first stacked module 10 is disposed closer to the vehicle body panel 110 of the vehicle 100 than the second stacked module 20, and the second stacked module 20 is stacked on the surface 11*a* that is opposite to the vehicle body panel 110 of the flat routing member 11 in the stacking direction X. By employing this configuration, in the wiring harness WH, for example, the first stacked module 10 and the second stacked module 20 can be stacked more easily, more smoothly, or more stably in comparison with a case where the second stacked module 20 is disposed closer to the vehicle body panel 110.

Furthermore, in the wiring harness WH according to the present embodiment, the first connector 12 and the second connector 22 are connectable to the control device 40 that has been equipped in the vehicle 100, and the first connector 12 and the second connector 22 are respectively fitted into the connectors 41 and 42 on the side of the control device 40 in accordance with fastening the control device 40 to the vehicle body panel 110 by using the fastening member 50. By using this configuration, in the wiring harness WH, for example, the fastening member 50 functions as an assistance bolt at the time of collectively fitting the first connector 12 and the second connector 22 into the connectors 41 and 42 on the side of the control device, and therefore a task of fitting the first connector 12 and the second connector 22 into the connectors 41 and 42 on the side of the control device can be performed more easily or more smoothly.

Furthermore, in the wiring harness WH according to the present embodiment, the flat routing member 11 includes the opening 11*g* that penetrates in the stacking direction X, and the second connector 22 includes the leg 22*a* that protrudes in the stacking direction X, and abuts onto the vehicle body panel 110 through the opening 11*g*. By employing this configuration, in the wiring harness WH, for example, the opening 11*g* engages with the leg 22*a*, and therefore the second connector 22 can be positioned relative to the flat routing member 11, and the flat routing member 11 can be prevented from being affected (damaged) at the time of fitting the second connector 22 into the connector 42 on the side of the control device 40.

Furthermore, in the wiring harness WH according to the present embodiment, the second connector 22 includes the housing 22A that covers the plurality of routing members 21 from one side in the stacking direction X, and the undercover 22B that covers the plurality of routing members 21 from another side in the stacking direction X, and is open on both sides in the extending direction Y. By employing this configuration, in the wiring harness WH, for example, the undercover 22B enables the plurality of routing members 21 to be led out from any of both sides in the extending direction Y, and therefore a part can be shared in plural types of specifications that are different in a method for leading out the plurality of routing members 21.

Note that, in the present embodiment, a case where the first stacked module 10 is disposed closer to the vehicle body panel 110 has been described as an example, but this example is not restrictive, and for example, the second stacked module 20 may be disposed closer to the vehicle body panel 110, and the flat routing member 11 of the first stacked module 10 may be stacked on the plurality of routing members 21 of the second stacked module 20. Furthermore, in the present embodiment, a case where the wiring harness WH has been attached to the vehicle body panel 110 made of resin has been described as an example, but this example is not restrictive, and for example, the wiring harness WH may be attached to the dash panel body 125 made of metal, or a panel (a door panel, a roof panel, a floor panel, or the like) that is different from the dash panel 120.

In the wiring harness according to the present embodiment, the second stacked module can be disposed to be stacked on the first stacked module in the stacking direction, in a state where both the second connector and the first connector face one side in the stacking direction. As a result of this, the wiring harness exhibits an advantageous effect in which mountability on a vehicle can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wiring harness comprising:

a first stacked module that includes a flat routing member having flexibility, and a first connector that is provided on the flat routing member; and a second stacked module that includes a plurality of routing members having conductivity, and a second connector that is provided on the plurality of routing members, wherein the second stacked module is stacked on the first stacked module in a stacking direction in a state where both the second connector and the first connector face one side in the stacking direction, the stacking direction crossing an extending direction of the flat routing member.

2. The wiring harness according to claim 1, wherein the plurality of routing members is formed by using a communication line that transmits a signal, or a power line that transmits power, and is routed to be planarly arranged.

3. The wiring harness according to claim 2, wherein the first stacked module is disposed closer to a vehicle body panel of a vehicle than the second stacked module, and the second stacked module is stacked on a surface that is opposite to the vehicle body panel of the flat routing member in the stacking direction.

4. The wiring harness according to claim 3, wherein the first connector and the second connector are connectable to a control device that has been equipped in the vehicle, and the first connector and the second connector are respectively fitted into connectors on a side of the control device in accordance with fastening the control device to the vehicle body panel by using a fastening member.

5. The wiring harness according to claim 4, wherein the flat routing member includes an opening that penetrates in the stacking direction, and the second connector includes a leg that protrudes in the stacking direction, and abuts onto the vehicle body panel through the opening.

6. The wiring harness according to claim 1, wherein the first stacked module is disposed closer to a vehicle body panel of a vehicle than the second stacked module, and the second stacked module is stacked on a surface that is opposite to the vehicle body panel of the flat routing member in the stacking direction.

7. The wiring harness according to claim 6, wherein the first connector and the second connector are connectable to a control device that has been equipped in the vehicle, and the first connector and the second connector are respectively fitted into connectors on a side of the control device in accordance with fastening the control device to the vehicle body panel by using a fastening member.

8. The wiring harness according to claim 7, wherein the flat routing member includes an opening that penetrates in the stacking direction, and the second connector includes a leg that protrudes in the stacking direction, and abuts onto the vehicle body panel through the opening.

9. The wiring harness according to claim 2, wherein the second connector includes a housing that covers the plurality of routing members from one side in the stacking direction, and an undercover that covers the plurality of routing members from another side in the stacking direction, and is open on both sides in the extending direction.

10. The wiring harness according to claim 1, wherein the second connector includes a housing that covers the plurality of routing members from one side in the stacking direction, and an undercover that covers the plurality of routing members from another side in the stacking direction, and is open on both sides in the extending direction.

* * * * *